(12) United States Patent
Kalilec

(10) Patent No.: US 12,187,348 B2
(45) Date of Patent: Jan. 7, 2025

(54) SYSTEM FOR PREVENTING RUST ON VEHICLE DRAIN HOLES

(71) Applicant: John-Paul Kalilec, Wayne, PA (US)

(72) Inventor: John-Paul Kalilec, Wayne, PA (US)

( * ) Notice: Subject to any disclaimer, the term of this patent is extended or adjusted under 35 U.S.C. 154(b) by 224 days.

(21) Appl. No.: 18/060,061

(22) Filed: Nov. 30, 2022

(65) Prior Publication Data
US 2024/0174299 A1    May 30, 2024

(51) Int. Cl.
*B62D 25/24*    (2006.01)
*B60R 13/07*    (2006.01)

(52) U.S. Cl.
CPC ............ *B62D 25/24* (2013.01); *B60R 13/07* (2013.01)

(58) Field of Classification Search
CPC ................................ B62D 25/24; B60R 13/07
USPC .................................................. 296/1.06, 154
See application file for complete search history.

(56) References Cited

U.S. PATENT DOCUMENTS

| | | | | |
|---|---|---|---|---|
| 3,158,176 A * | 11/1964 | Toland | ................ | B60R 13/07 49/374 |
| 3,175,727 A * | 3/1965 | Tillie | ................ | F16J 13/02 220/236 |
| 3,700,135 A * | 10/1972 | Collier | ................ | B65D 51/00 220/200 |
| 4,216,707 A * | 8/1980 | Pennington | ........... | F16J 15/064 52/302.1 |
| 4,560,083 A * | 12/1985 | Danico | ................ | B62D 25/24 220/795 |
| 5,291,845 A * | 3/1994 | Vallery | ................ | B63B 19/14 114/201 R |
| 5,294,169 A * | 3/1994 | Roy | ................ | B62D 25/24 296/146.5 |
| 9,248,867 B2 * | 2/2016 | Chopra | ................ | B62D 25/24 |
| 9,592,857 B2 * | 3/2017 | Eckstein | ............ | F16K 17/0453 |
| 10,549,790 B2 * | 2/2020 | Marchlewski | ......... | B62D 25/20 |
| 11,325,656 B2 * | 5/2022 | Glickman | ................ | B60R 7/02 |
| 2024/0124072 A1 * | 4/2024 | Ito | ................ | B62D 25/24 |
| 2024/0174301 A1 * | 5/2024 | Palomer | ................ | B62D 25/24 |

FOREIGN PATENT DOCUMENTS

JP     H092337 A  *  1/1999

OTHER PUBLICATIONS

Translation of JP-H092337-A. (Year: 2024).*

* cited by examiner

*Primary Examiner* — Jason S Morrow
(74) *Attorney, Agent, or Firm* — Stuart M. Goldstein

(57) ABSTRACT

A system for preventing rust and corrosion on vehicle drain holes utilizes a sealing gasket with a bottom opening. The gasket is configured to cover the vehicle drain hole. An exterior guard member has an upper shield component and a lower water and debris collection chamber having chamber drain holes. The guard member is configured to cover the sealing gasket, such that moisture and debris from the vehicle drain hole flows through the bottom opening of the gasket, into the collection chamber, and out through the chamber drain holes, thus eliminating water and other foreign debris from the area and thus providing a significant measure of protection to the drain holes in preventing rust and corrosion.

16 Claims, 5 Drawing Sheets

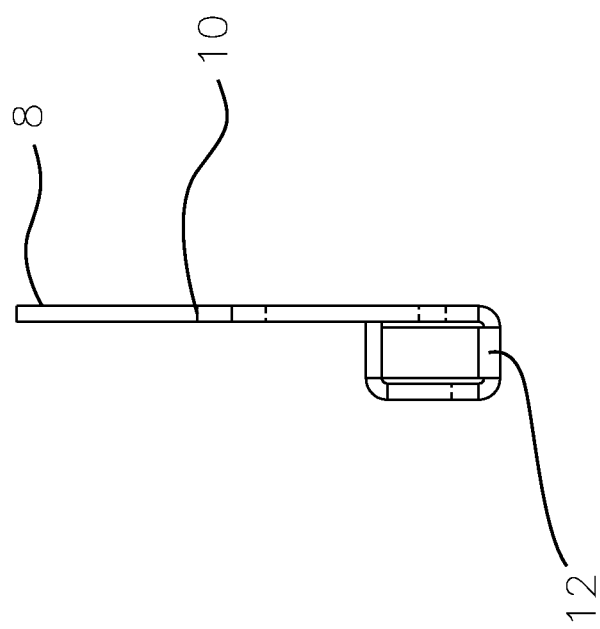
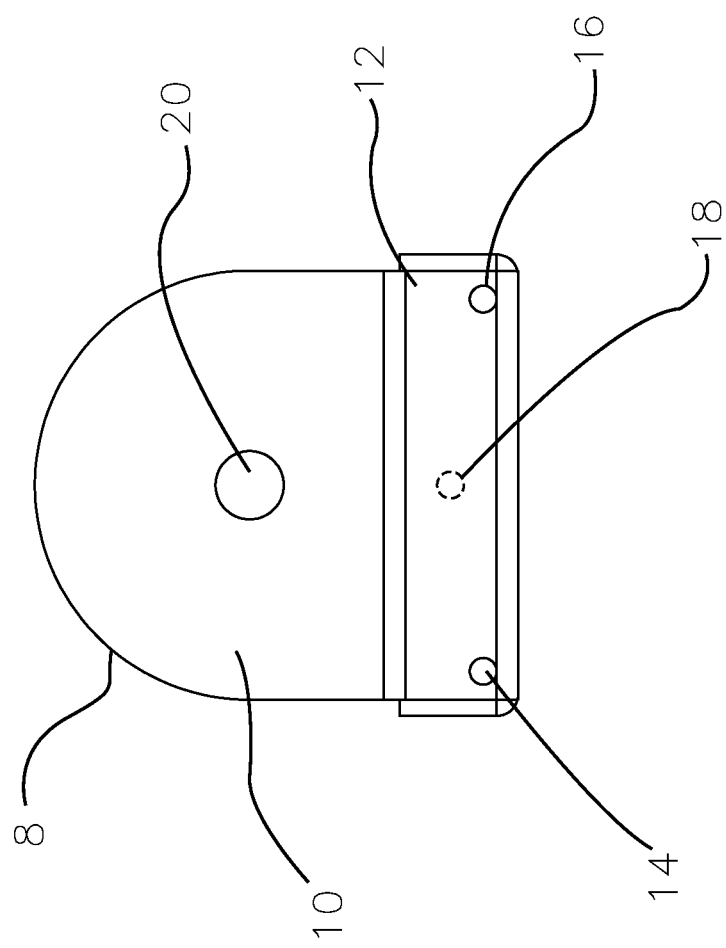
FIG. 1
FIG. 2

SYSTEM FOR PREVENTING RUST ON VEHICLE DRAIN HOLES

FIELD OF THE INVENTION

The present invention relates to preventing rust and corrosion on and around the drain holes of vehicle inner rocker panels and associated vehicle inner pockets.

BACKGROUND OF THE INVENTION

The current design of many vehicles includes functional drain holes which lead to inner rocker panels or other vehicle area pockets in which water remains present and can accumulate. These parts of the vehicle are fabricated of rust prone metal, i.e. steel, that when exposed to moisture and common road salt and other debris results in rust and corrosion. It is important that these vehicle drain holes be allowed to function as originally intended. As a result, they must be protected from deleterious moisture, salt, and other foreign debris, while still allowing them to function effectively.

SUMMARY OF THE INVENTION

These and other objects of the present invention are provided by a system for preventing rust and corrosion on vehicle drain holes utilizing a sealing gasket with a bottom opening. The gasket is configured to cover the vehicle drain hole. An exterior guard member has an upper shield component and a lower water and debris collection chamber having chamber drain holes. The guard member is configured to cover the sealing gasket, such that moisture and debris from the vehicle drain hole flows through the bottom opening of the gasket, into the collection chamber, and out through the chamber drain holes, thus eliminating water and other foreign debris from the area and thus providing a significant measure of protection to the drain holes in preventing rust and corrosion.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 1 is a front view of the exterior guard member of the present invention.

FIG. 2 is an elevation view of the exterior guard member of the present invention.

DETAILED DESCRIPTION OF THE INVENTION

Figure 3:
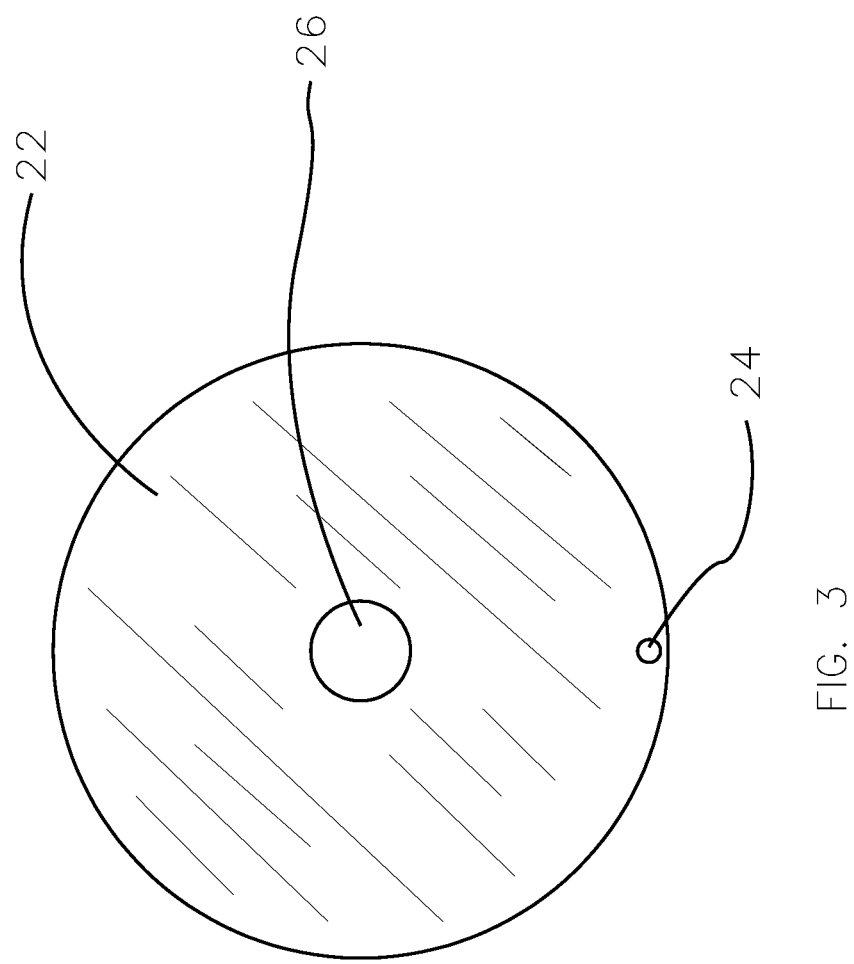
FIG. 3 is a front view of the sealing gasket of the present invention.

The system of the present invention comprises exterior guard member 8 having upper shield component 10 and lower water and debris collection chamber 12. Drain opening 18 and center opening 20 extend through upper shield component 10. Chamber drain holes 14 and 16 extend through lower water and debris collection member 12.

Figure 4:
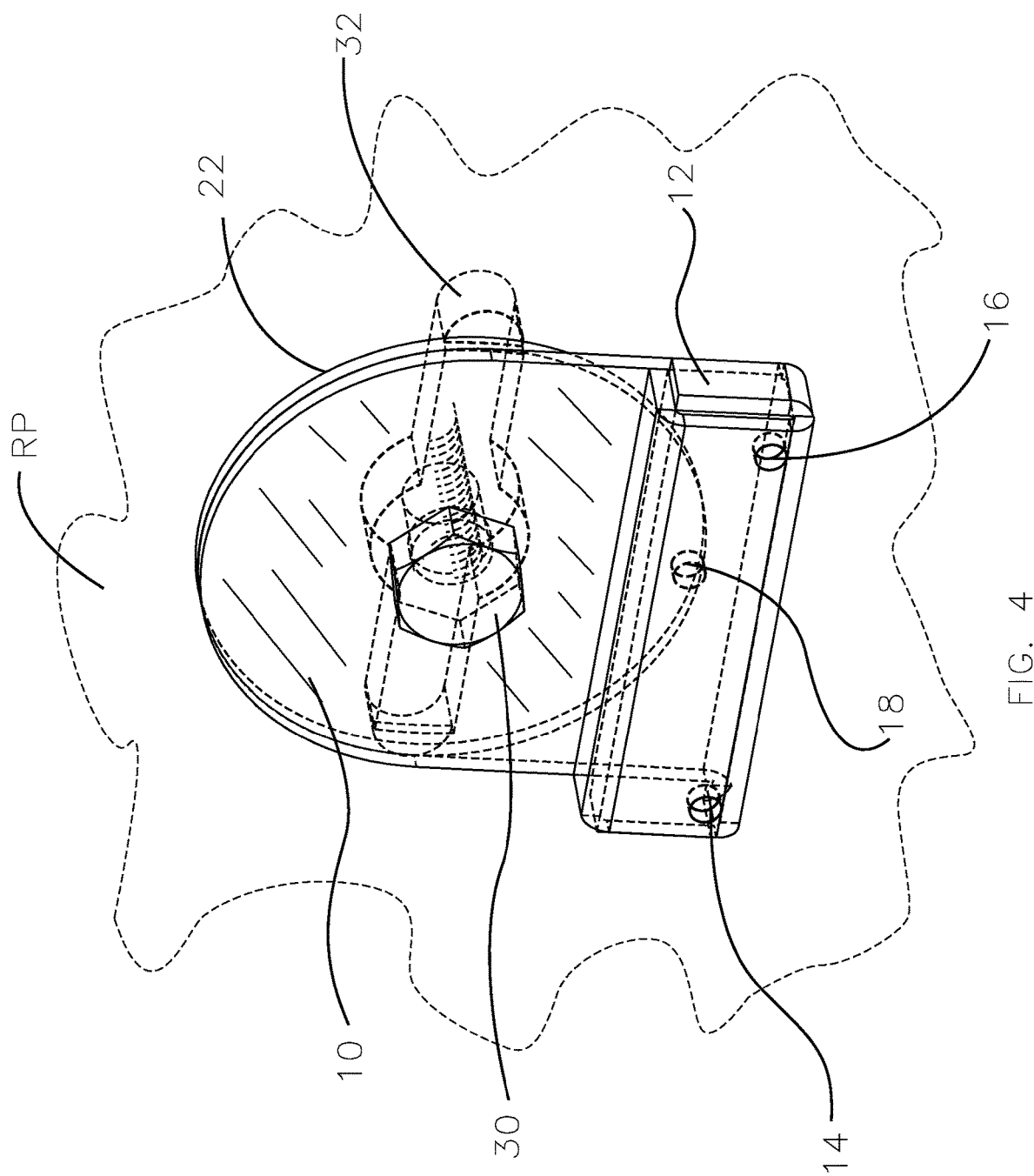
FIG. 4 is a front view of the present invention, in place and secured to a rocker panel.
Figure 6:
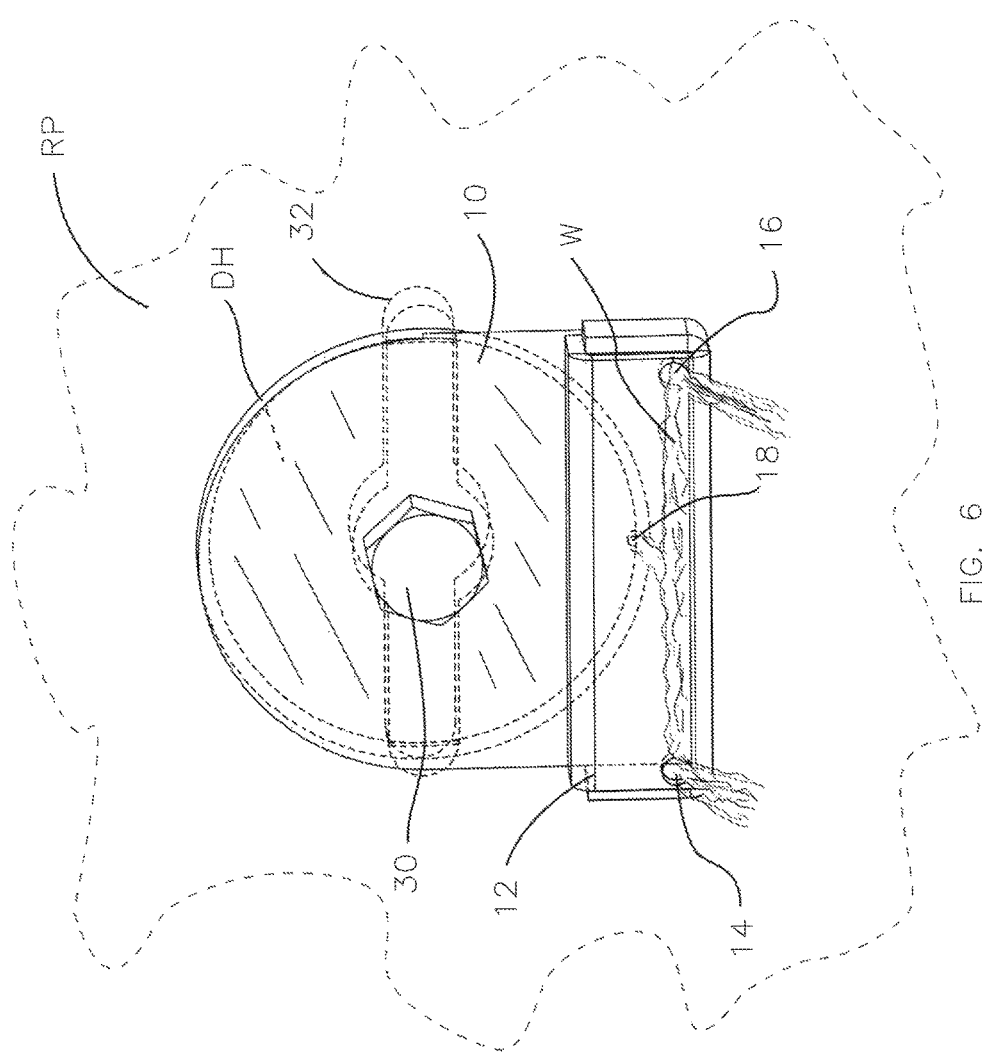
FIG. 6 illustrates the manner of operation of the present invention.

Sealing gasket 22 comprises lower drain opening 24 and center opening 26. Gasket 22 is configured to be positioned over drain hole DH, as best seen in FIG. 3, and beneath upper shield component 10 of exterior guard member 8. As best depicted in FIGS. 4 and 6, drain opening 18 of upper shield component 10 is aligned over lower drain opening 24 of gasket 22 and center opening 20 of the shield component is aligned over center opening 26 of the gasket.

Figure 5:
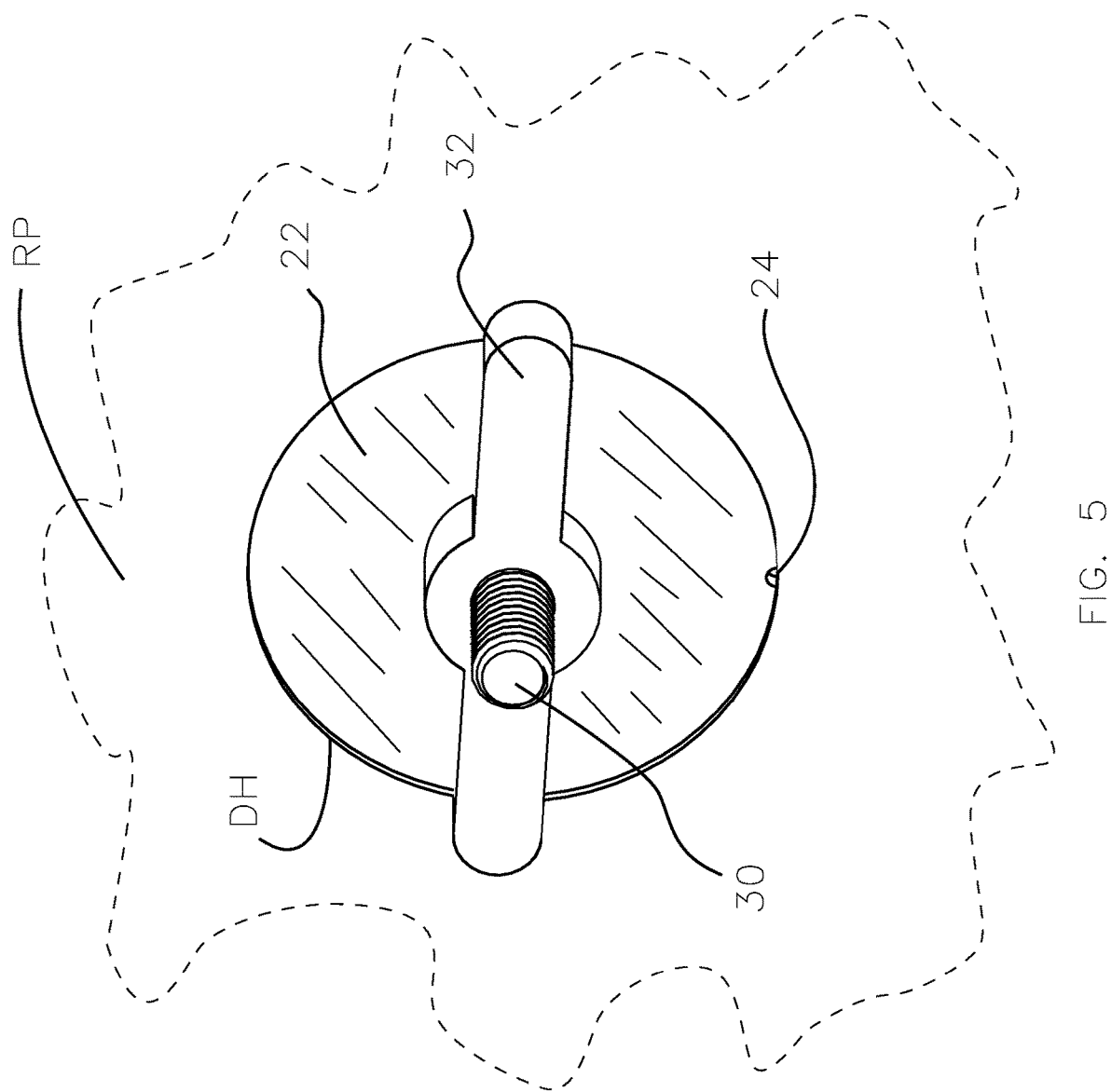
FIG. 5 is a rear view of the sealing gasket secured in place over a rocker panel.

Exterior guard member 8 and sealing gasket 22 are held in position over drain hole DH by fastening means comprising bolt 30 and wing nut 32. Bolt 30 extends through center openings 20 of upper shield component 10 and 26 of sealing gasket 22 and wing nut 32 is threadably engaged to and tightened on the bolt so as to snuggly secure the exterior guard member and sealing gasket against drain hole DH, as best seen in FIGS. 4 and 5.

In operation, water W which enters into drain hole DH, initially flows through bottom opening 24 of sealing gasket 22, and then through drain opening 18 in the exterior guard member 8. Water W accumulates in lower water and debris collection chamber 12 where it eventually exits through chamber drain holes 14 and 16.

In this manner, deleterious water, salts, and other debris are syphoned away from drain hole DH and hence away from rocker panel RP, thereby arresting the build-up of rust and corrosion on and around the rocker panel and, its associated vehicle pockets.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A system for preventing rust on and corrosion of vehicle drain holes, said system comprising:
    a sealing gasket configured to cover a vehicle drain hole, said gasket having a bottom opening; and
    an exterior guard member comprising an upper shield component with a drain opening and a lower water and debris collection chamber having at least one chamber drain hole, the guard member being configured to cover the sealing gasket; wherein moisture and debris from the vehicle drain hole is configured to flow through the bottom opening of the gasket, through the drain opening, into the collection chamber, and out through the at least one chamber drain hole.

2. The system as in claim 1 wherein both the sealing gasket and the upper shield component have center openings which are aligned with each other.

3. The system as in claim 1 wherein the sealing gasket bottom opening and the upper shield component drain opening are aligned with each other.

4. The system as in claim 3 wherein both the sealing gasket and the upper shield component have center openings which are aligned with each other.

5. The system as in claim 2 further comprising fastening means for securing the guard member against the sealing gasket and the sealing gasket against the vehicle drain hole.

6. The system as in claim 5 wherein the fastening means comprises a bolt extending through the center openings of the sealing gasket and the upper shield component and a wingnut threadably engaged with the bolt.

7. The system as in claim 1 wherein there are two chamber drain holes.

8. A system for preventing rust on and corrosion of vehicle drain holes, said system comprising:
   a sealing gasket configured to cover a vehicle drain hole, said gasket having a bottom opening;
   an upper shield component with a drain opening and a lower water and a debris collection chamber having at least one chamber drain hole, the upper shield component configured to cover the sealing gasket; wherein moisture and debris from the vehicle drain hole is configured to flow through the bottom opening of the gasket, through the drain opening, into the collection chamber, and out through the at least one chamber drain hole.

9. The system as in claim 8 wherein both the sealing gasket and the upper shield component have center openings which are aligned with each other.

10. The system as in claim 8 wherein the sealing gasket bottom opening and the upper shield component drain opening are aligned with each other.

11. The system as in claim 10 wherein both the seal gasket and the upper shield component have center openings which are aligned with each other.

12. The system as in claim 7 further comprising fastening means for rigidly securing the guard member against the sealing gasket and the sealing gasket against the vehicle drain hole.

13. The system as in claim 12 wherein the fastening means comprises a bolt extending through the center openings of the sealing gasket and the upper shield component and a wingnut threadably engaged with the bolt.

14. The system as in claim 8 wherein there are two chamber drain holes.

15. A method for preventing rust on and corrosion of vehicle drain holes, said method comprising the steps of:
   providing a sealing gasket having a center opening and a bottom opening;
   covering a vehicle drain hole with the sealing gasket;
   providing an exterior guard member comprising an upper shield component with a center opening and a drain opening and a lower water and debris collection component chamber having at least one chamber drain hole;
   covering the sealing gasket with the upper shield component of the exterior guard member, such that the center openings of the sealing gasket and the upper shield components are aligned one over another;
   providing fastener means in the form of an elongated threaded bolt and corresponding threaded wingnut;
   inserting the elongated bolt through the center openings of the sealing gasket and the upper shield component;
   threadably engaging the wingnut onto the threaded bolt;
   tightening the wingnut on the threaded bolt to rigidly secure the sealing gasket and the upper shield component against the vehicle drain hole; wherein moisture and debris from the vehicle drain hole flows through the bottom opening of the gasket, the drain opening of the upper shield component, into the collection chamber, and out through the at least one chamber drain hole.

16. The method as in claim 15 wherein the sealing gasket bottom opening and the upper shield component drain opening are aligned with each other.

* * * * *